Figure 1:
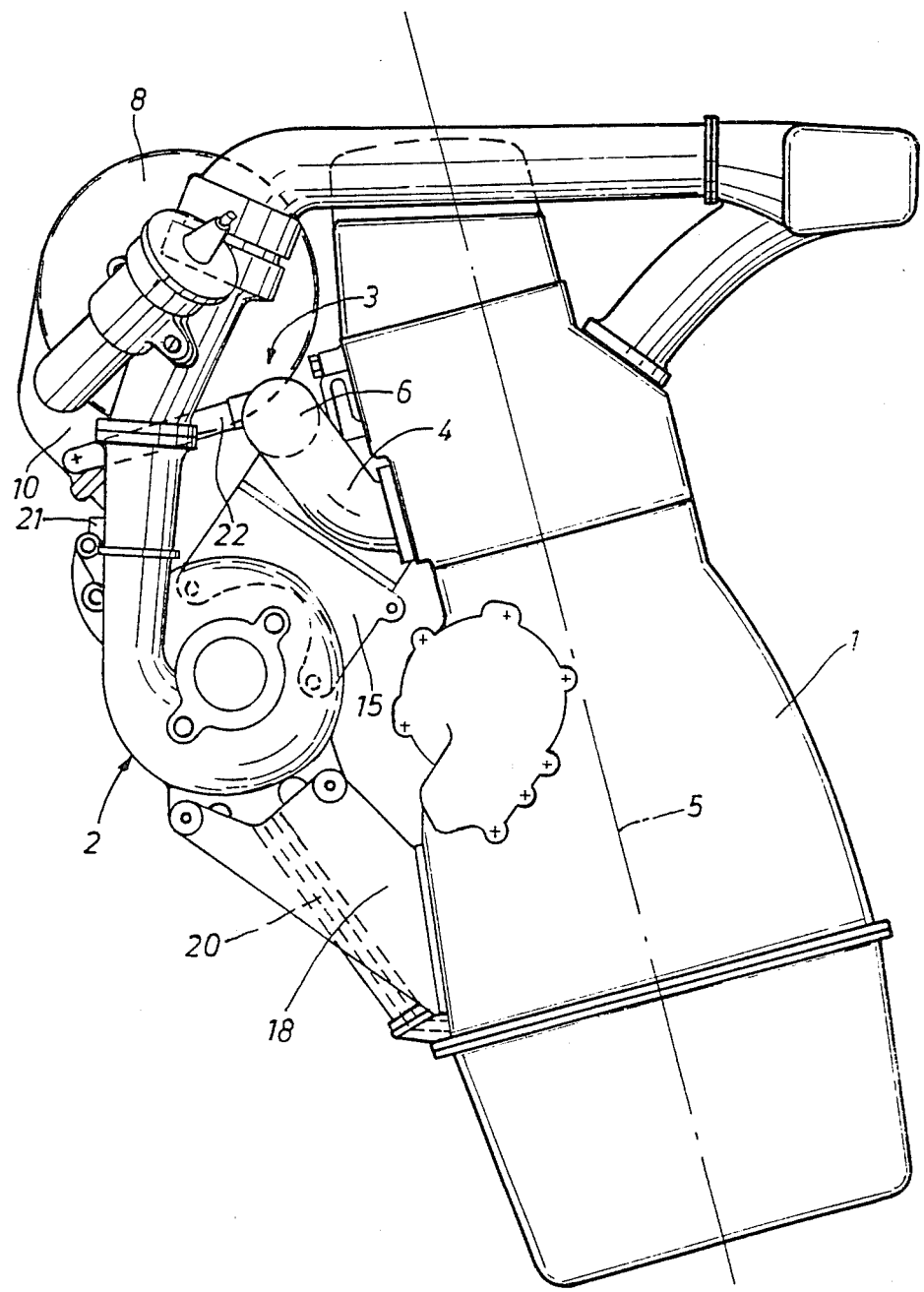

United States Patent [19]

Conrad et al.

[11] Patent Number: 4,709,548

[45] Date of Patent: Dec. 1, 1987

[54] ARRANGEMENT OF A SOOT FILTER IN THE EXHAUST GAS SYSTEM OF AN INTERNAL COMBUSTION ENGINE WITH AN EXHAUST GAS TURBOCHARGER

[75] Inventors: Ulrich Conrad, Ludwigsburg; Guenter Kellermann, Stuttgart; Angela Breymayer, Altbach; Rolf Klinker, Stuttgart; Oswald Schuldt, Korb; Rainer Hoffmann, Ostfildern; Frank-Dietrich Fabian, Kernen, all of Fed. Rep. of Germany

[73] Assignee: Daimler-Benz Aktiengesellschaft, Stuttgart, Fed. Rep. of Germany

[21] Appl. No.: 897,629

[22] Filed: Aug. 18, 1986

[30] Foreign Application Priority Data

Aug. 17, 1985 [DE] Fed. Rep. of Germany ....... 3529542

[51] Int. Cl.⁴ .......................... F01N 3/02; F02B 37/00
[52] U.S. Cl. ......................................... 60/280; 60/311; 60/605
[58] Field of Search .......................... 60/280, 311, 605

[56] References Cited

U.S. PATENT DOCUMENTS 3,798,906 3/1974 Woollenweber ..................... 60/280
4,553,387 11/1985 Mayer .................................. 60/280

FOREIGN PATENT DOCUMENTS 3204176 8/1983 Fed. Rep. of Germany .
44324 4/1977 Japan .................................... 60/280

Primary Examiner—Douglas Hart
Attorney, Agent, or Firm—Barnes & Thornburg

[57] ABSTRACT

An arrangement of a soot filter in the exhaust gas system of an internal combustion engine equipped with an exhaust gas turbocharger whose turbine housing is arranged downstream of the exhaust gas manifold. For purposes of achieving a fastening of the soot filter at the internal combustion engine which is favorable from an assembly point of view, space-saving and compensating changes in length, the soot filter and the exhaust gas turbocharger form a unit which is retained, on the one hand, angularly movably at the exhaust gas manifold by means of a pipe connection of the soot filter and, on the other, at the crankcase by way of supports arranged at the exhaust gas turbocharger on the housing side.

12 Claims, 2 Drawing Figures

ARRANGEMENT OF A SOOT FILTER IN THE EXHAUST GAS SYSTEM OF AN INTERNAL COMBUSTION ENGINE WITH AN EXHAUST GAS TURBOCHARGER

The present invention relates to an arrangement of a soot filter in the exhaust gas system of an internal combustion engine with an exhaust gas turbocharger whose turbine housing is arranged downstream of the exhaust gas manifold.

An air-compressing internal combustion engine with an exhaust gas turbocharger and two soot filters traversed alternately by the exhaust gases is disclosed in the DE-OS No. 32 04 176. While the exhaust stream of the internal combustion engine flows through the first soot filter, the second soot filter is acted upon forcibly by the exhaust gases of a burner and is regenerated. However, it is thereby of disadvantage that by reason of the arrangement of the soot filters in the exhaust gas stream, a regeneration is possible only by the use of the burner. A compact space-saving construction also is not possible by the use of two soot filters arranged parallel to one another and of the burner.

It is the object of the present invention to secure a soot filter at the internal combustion engine so as to assure ease of installation, saving in space and ability of uni-axial changes in length.

The underlying problems are solved according to the present invention in that the soot filter and the exhaust gas turbocharger form a unit which is retained, on the one hand, angularly movably at the exhaust gas manifold by means of a short pipe connection of the soot filter and by means of a support at the exhaust gas connection and which, on the other hand, is retained by means of supports arranged at the housing of the exhaust gas turbocharger, at the exhaust-side longitudinal wall of the internal combustion engine housing essentially rigidly in the direction of the internal combustion engine vertical and transverse axes and limitedly movably in the direction of the internal combustion engine longitudinal axis.

The arrangement of the soot filter according to the present invention offers the advantage that the regeneration process of the soot filter takes place automatically without process-temperature-increasing measures because the soot filter is secured at the exhaust gas manifold and thus is acted upon directly by the exhaust gas flow of the internal combustion engine. As the thermally highly loaded structural parts consisting of the soot filter and exhaust gas turbocharger form a unit, the latter is so secured at the internal combustion engine that no forces occur inside of these structural parts which destroy the same. Thermally conditioned changes in length of the structural parts are compensated for in a space-saving manner predominantly in parallel to the internal combustion engine longitudinal axis. Due to the fact that the unit is secured at the internal combustion engine in parallel to the internal combustion engine longitudinal axis by way of supports, the installation thereof can be carried out easily and in a manner compensating for manufacturing tolerances, whereby the arrangement of the components or structural parts such as soot filter and exhaust gas turbocharger enables, especially in the vertical direction, a good space utilization between the internal combustion engine and the walls of the internal combustion space on the side of the wheels.

Figure 2:
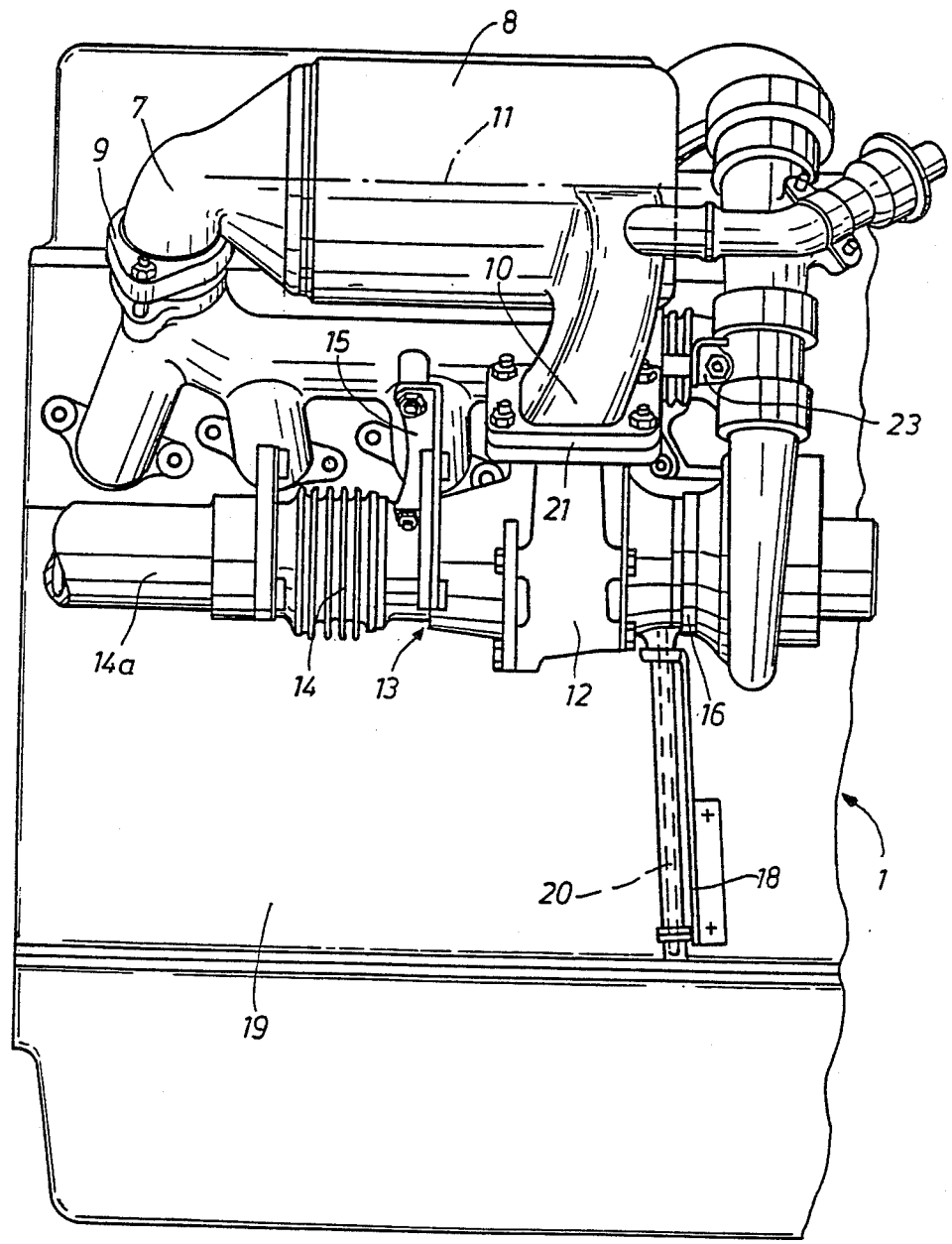

These and other objects, features and advantages of the present invention will become more apparent from the following description when taken in connection with the accompanying drawing which shows, for purposes of illustration only, one embodiment in accordance with the present invention, and wherein:

FIG. 1 is an end elevational view of an internal combustion engine with auxiliary aggregates in accordance with the present invention; and FIG. 2 is a side elevational view of the internal combustion engine of FIG. 1 with a soot filter connected to the exhaust gas manifold and with the exhaust gas turbocharger arranged below the soot filter.

Referring now to the drawing wherein like reference numerals are used throughout the two views to designate like parts, an air-compressing internal combustion engine 1 equipped with an exhaust gas turbocharger generally designated by reference numeral 2 is illustrated in FIG. 1. An exhaust gas system generally designated by reference numeral 3 of the internal combustion engine 1 includes exhaust gas pipes which terminate in an exhaust gas manifold 6 extending in parallel to the internal combustion engine longitudinal axis 5. A short pipe connection 7 (FIG. 2) of the soot filter 8 extending in parallel to the exhaust gas manifold 6 is connected with the exhaust gas manifold 6 by way of a ball-shaped flange 9. An exhaust gas connection 10 located at the end face of the soot filter 8 branches off at right angle to the soot filter longitudinal axis 11 on the side opposite the internal combustion engine and terminates in the exhaust gas inlet of the turbine housing 12 of the exhaust gas turbocharger 2 which is arranged extending axially parallelly underneath the soot filter 8. The exhaust gas outlet side 13 of the turbine housing 12 is connected according to FIG. 2 by way of corrugated tubing 14 to the connecting pipe 14a of the exhaust gas system 3. The soot filter 8 and exhaust gas turbocharger 2 which form a unit for the purpose of their fastening at the internal combustion engine 1, are secured at the exhaust gas pipe 4 of the internal combustion engine 1 by means of a first support 15 (FIGS. 1 and 2) arranged end-face at the outlet side 13 of the turbine housing 12. A second support 18 engages at the bearing housing 16 on the compressor side which is secured at the longitudinal wall 19 on the exhaust side of the internal combustion housing wall. A channel 20 is integrated in the support 18 through which the lubricating oil is returned from the bearing housing 16 to the lubricating oil circulation of the internal combustion engine 1. A third support 22 is secured at the connecting flange 21 on the soot filter side of the turbine housing 12 which is secured by means of a threaded connection 23 (FIG. 2) at a threaded element located at the exhaust gas pipe 6. The mounting openings of the supports 15, 18 and 22 (not shown) have elongated apertures for the compensation of manufacturing tolerances. As a result of the arrangement and the construction of the supports 15, 18 and 22, the latter are essentially rigid in the direction of the internal combustion engine vertical and cross axis and are held deflectable within limits in the direction of the internal combustion engine longitudinal axis in order to absorb changes in length which occur as a result of thermal loads of the unit.

An exhaust gas recirculating line 26 terminates downstream of the compressor of the exhaust gas turbocharger 2 in a mixing pipe section 24 of the suction line 25, which exhaust gas recirculating line branches off from the exhaust gas connection 10. An adjusting member 27 with an adjusting drive 28 actuated by an auxiliary force is provided in the exhaust gas recirculating line 26 on the side of the mixing pipe.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement of a soot filter in the exhaust gas system of an internal combustion engine equipped with an exhaust gas turbocharger means whose turbine housing is arranged downstream of the exhaust gas manifold of the internal combustion engine, in which the soot filter and exhaust gas turbocharger means form a unit, the soot filter including a short connecting pipe, said unit being angularly movably retained at the exhaust gas manifold by way of said short connecting pipe and at an exhaust gas pipe connection by way of a first support means, and said unit being retained essentially rigidly in the direction of the internal combustion engine vertical and transverse axes and movably within limits in the direction of the internal combustion engine longitudinal axis at a longitudinal wall of the internal combustion engine by way of further support means arranged at housing means of the exhaust gas turbocharger means.

2. An arrangement according to claim 1, wherein the exhaust gas turbocharger means is provided underneath the soot filter which is arranged axially parallelly to the internal combustion engine longitudinal axis.

3. An arrangement according to claim 2, wherein said exhaust gas turborcharger means includes turbine and bearing housing means beneath the soot filter.

4. An arrangement according to claim 3, wherein the short pipe connection of the soot filter is secured at the exhaust gas manifold by way of a ball-shaped flange.

5. An arrangement according to claim 4, wherein one support means of said further support means engages at the end face of the turbine housing means on the outlet side thereof, said one support means being secured at the exhaust gas manifold, another support means of said further support means being provided at the bearing housing means and being arranged at the exhaust-side longitudinal wall of the internal combustion engine housing wall and still another support means of said further support means supported at the exhaust gas manifold being provided at a connecting flange of the soot filter and turbine housing means.

6. An arrangement according to claim 5, wherein the channel is integrated into the another support means through which lubricating oil is returned from the bearing housing means to the internal combustion engine.

7. An arrangement according to claim 6, wherein an exhaust gas recirculating line leads from the exhaust gas pipe connection to a mixing pipe section of a suction line.

8. An arrangement according to claim 1, wherein said exhaust gas turborcharger means includes turbine and bearing housing means beneath the soot filter.

9. An arrangement according to claim 1, wherein the short pipe connection of the soot filter is secured at the exhaust gas manifold by way of a ball-shaped flange.

10. An arrangement according to claim 1, wherein one support means of said further support means engages at the end face of the turbine housing means on the outlet side thereof, said one support means being secured at the exhaust gas manifold, another support means of said further support means being provided at the bearing housing means and being arranged at the exhaust-side longitudinal wall of the internal combustion engine housing wall and still another support means of said further support means supported at the exhaust gas manifold being provided at a connecting flange of the soot filter and turbine housing means.

11. An arrangement according to claim 1, wherein the channel is integrated into the another support means through which lubricating oil is returned from the bearing housing means to the internal combustion engine.

12. An arrangement according to claim 1, wherein an exhaust gas recirculating line leads from the exhaust gas pipe connection to a mixing pipe section of a suction line.

* * * * *